B. P. FRAZEE.
AUTOMOBILE SLEIGH ATTACHMENT.
APPLICATION FILED JULY 15, 1911.
1,028,819.
Patented June 4, 1912.
2 SHEETS—SHEET 1.
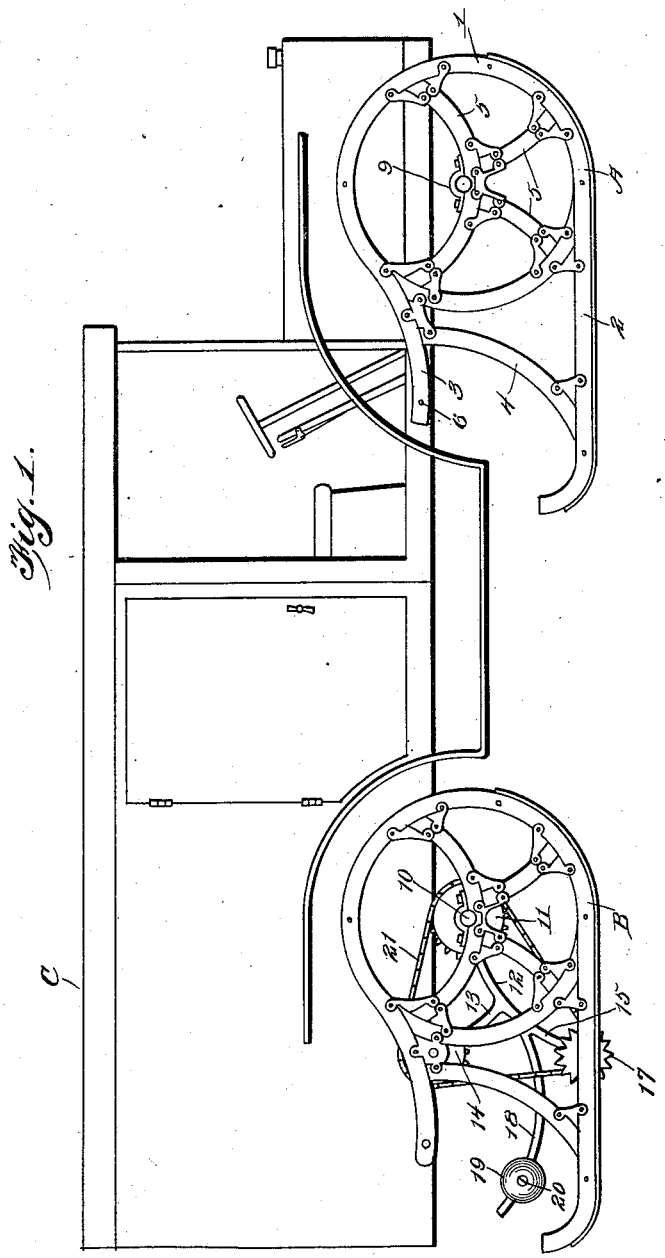
Witnesses
Inventor
Bowditch Place Frazee
By Victor J. Evans
Attorney B. P. FRAZEE.
AUTOMOBILE SLEIGH ATTACHMENT.
APPLICATION FILED JULY 15, 1911.
1,028,819.
Patented June 4, 1912.
2 SHEETS—SHEET 2.
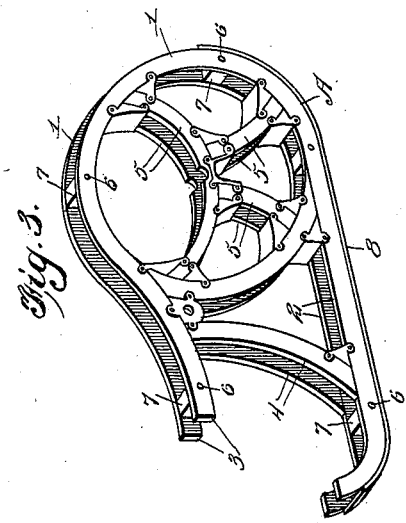
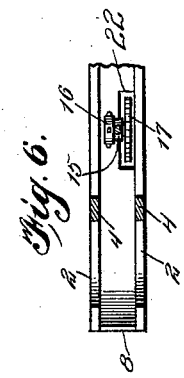
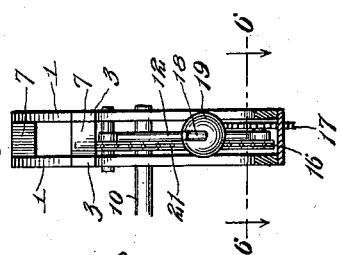
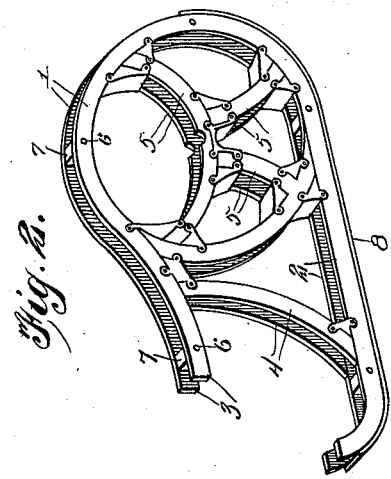
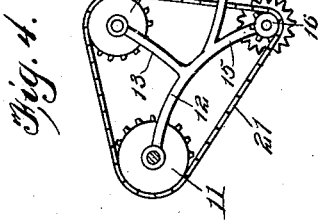
Inventor
Bowditch Place Frazee
Witnesses
Louis R. Heinrichs
By Victor J. Evans
Attorney

UNITED STATES PATENT OFFICE.

BOWDITCH PLACE FRAZEE, OF BATH, MAINE.

AUTOMOBILE SLEIGH ATTACHMENT.

1,028,819.  Specification of Letters Patent.  Patented June 4, 1912.

Application filed July 15, 1911. Serial No. 638,654.

*To all whom it may concern:*

Be it known that I, BOWDITCH PLACE FRAZEE, a citizen of the United States, residing at Bath, in the county of Sagadahoc and State of Maine, have invented new and useful Improvements in Automobile Sleigh Attachments, of which the following is a specification.

This invention relates to automobile sleigh attachments, and it has for its object to produce a simple and improved sleigh attachment which may be conveniently applied to an ordinary automobile or motor vehicle as a substitute for the wheels in order to enable such vehicle to be propelled over ice and snow in a manner similar to a sleigh.

A further object of the invention is to provide a set of runners which may be readily applied to an automobile, some of said runners being provided with propulsion means adapted to be actuated by the motor of the automobile.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a side elevation of a motor vehicle equipped with the improved sleigh attachment. Fig. 2 is a perspective view of one of the front runners. Fig. 3 is a perspective view of one of the rear runners. Fig. 4 is a detail view in side elevation of the propulsion means used in connection with the rear runner. Fig. 5 is a rear elevation of one of the rear runners. Fig. 6 is a horizontal sectional view taken on the line 6—6 in Fig. 5.

Corresponding parts in the several figures are denoted by like characters of reference.

The front and rear runners A and B of the improved sleigh attachment may be constructed of bent wood, metal or of any other suitable material or materials. Each of the runners is composed of two side members, each of which comprises a circular frame structure 1, a rearwardly extending base member 2, a rearwardly extending top member 3, a brace 4 connecting the base member with the top member and braces 5 reinforcing the circular frame structure 1. The side members are connected and spaced apart by means of connecting members, such as bolts 6 and spacing blocks 7. The spacing means also includes a runner shoe 8 interposed between the base members 2, 2 of the side members of the device. The upper brace members 5 of the circular frame structures are provided with bearing boxes 9 adapted to support the axles of an automobile or motor vehicle, the body of which is shown at C in Fig. 1 of the drawings.

The rear axle 10 is provided with loose sprocket wheels 11 located between the side members of the runner structure, and these sprockets are to be driven in any suitable manner by power supplied from the motor of the vehicle. Supported pivotally upon the axle 10 adjacent to each structure 11 is a frame 12 having an upwardly extending arm 13 carrying an idler 14, a downwardly extending arm 15 carrying a sprocket 16 and a toothed propulsion wheel 17, and a rearwardly extending arm 18 upon which a weight 19 is adjustably mounted by a set screw 20. A chain 21 guided over the idler 14 connects the sprocket wheel 16 with the driven sprocket wheel 11 from which motion is thus transmitted to the toothed propulsion wheel 17, which latter projects downwardly through a slot 22 in the runner shoe. The weighted arm 18 projects rearwardly between the brace members 4, 4 and serves to hold the propulsion wheel forcibly in contact with the surface of the road over which the sleigh is to travel.

As will be readily seen from the foregoing description, the runner members may be conveniently applied to an ordinary automobile or motor vehicle, and power may be transmitted from the motor of such vehicle to the sprocket wheels 11 and from the latter to the propulsion wheels which will serve to propel the vehicle at such speed as may be desired.

Having thus described the invention, what is claimed as new, is:—

In a sleigh attachment for automobiles, a runner including two side members suitably spaced and connected together by means including a shoe having a longitudinal slot, a driven sprocket wheel, a pivotally supported frame carrying an idler and a propulsion wheel extending through the slot in the shoe, a chain guided over the idler to transmit motion from the driven sprocket wheel to the propulsion wheel, and a weighted arm extending rearwardly from the frame between the side members of the runner.

In testimony whereof I affix my signature in presence of two witnesses.

BOWDITCH PLACE FRAZEE.

Witnesses:
ELLA M. FRAZEE,
VENECTIA R. MELLEN.

Copies of this patent may be obtained for five cents each, by addressing the "Commissioner of Patents, Washington, D. C."